(12) United States Patent
Jian et al.

(10) Patent No.: US 10,545,603 B2
(45) Date of Patent: Jan. 28, 2020

(54) DISPLAY PANEL AND DISPLAY DEVICE

(71) Applicants: SHANGHAI AVIC OPTO ELECTRONICS CO., LTD., Shanghai (CN); TIANMA MICRO-ELECTRONICS CO., LTD., Shenzhen (CN)

(72) Inventors: Shoufu Jian, Shanghai (CN); Zhiqiang Xia, Shanghai (CN); Zhaokeng Cao, Shanghai (CN)

( * ) Notice: Subject to any disclaimer, the term of this patent is extended or adjusted under 35 U.S.C. 154(b) by 0 days.

(21) Appl. No.: 15/172,565

(22) Filed: Jun. 3, 2016

(65) Prior Publication Data

US 2017/0220178 A1    Aug. 3, 2017

(30) Foreign Application Priority Data

Feb. 2, 2016   (CN) .......................... 2016 1 0074295

(51) Int. Cl.
*G06F 3/041* (2006.01)
*G09G 3/36* (2006.01)
*G02F 1/1343* (2006.01)

(52) U.S. Cl.
CPC .......... *G06F 3/0416* (2013.01); *G06F 3/0412* (2013.01); *G09G 3/3655* (2013.01); *G02F 1/134309* (2013.01)

(58) Field of Classification Search
None
See application file for complete search history.

(56) References Cited

U.S. PATENT DOCUMENTS

| 2012/0019473 A1* | 1/2012 | Edwards | G06F 3/044 345/174 |
| 2014/0028616 A1* | 1/2014 | Furutani | G06F 3/044 345/174 |
| 2014/0299361 A1* | 10/2014 | Nakamura | G06F 3/044 174/253 |

FOREIGN PATENT DOCUMENTS

| CN | 102253752 A | 11/2011 |
| CN | 102314250 A | 1/2012 |
| CN | 102870073 A | 1/2013 |
| CN | 202748751 U | 2/2013 |
| CN | 103576360 A | 2/2014 |
| CN | 103577016 A | 2/2014 |
| CN | 104090403 A | 10/2014 |
| CN | 104503653 A | 4/2015 |

(Continued)

*Primary Examiner* — Nicholas J Lee
(74) *Attorney, Agent, or Firm* — Kilpatrick Townsend & Stockton, LLP

(57) ABSTRACT

A display panel is provided. The display includes a first electrode layer and a second electrode layer. The first electrode layer includes a plurality of first electrodes, each having a shape extending in a first direction, wherein the plurality of the first electrodes are arranged in a second direction. The second electrode layer includes a plurality of second electrodes extending in the second direction and arranged in the first direction, the second direction being perpendicular to the first direction. A ration between a first central distance between two adjacent first electrodes, and a second central distance between two adjacent second electrodes is in the range of 0.5 to 2. In the display panel and the display device according to the present disclosure, the display effect is reconciled with the touch recognizing performance, thereby improving the touch performance of the panel and user experience.

18 Claims, 12 Drawing Sheets

(56) References Cited

FOREIGN PATENT DOCUMENTS

| CN | 104915045 A | 9/2015 |
|---|---|---|
| CN | 205486024 U | 8/2016 |

\* cited by examiner

| 50' |
|---|
| 40' |
| 30' |
| 20' |
| 10' |

Fig. 1 (Prior Art)

| 50 |
|----|
| 40 |
| 30 |
| 20 |
| 10 |

Fig. 4

DISPLAY PANEL AND DISPLAY DEVICE

CROSS-REFERENCE TO RELATED APPLICATIONS

This application is based upon and claims priority to Chinese Patent Application 201610074295.6, filed on Feb. 2, 2016, the entire contents of which are incorporated herein by reference.

TECHNICAL FIELD

The present disclosure relates to the field of display technology, and more particularly, to a display panel and a display device that may improve touch performance of the panel and user experience.

BACKGROUND

Figure 1:
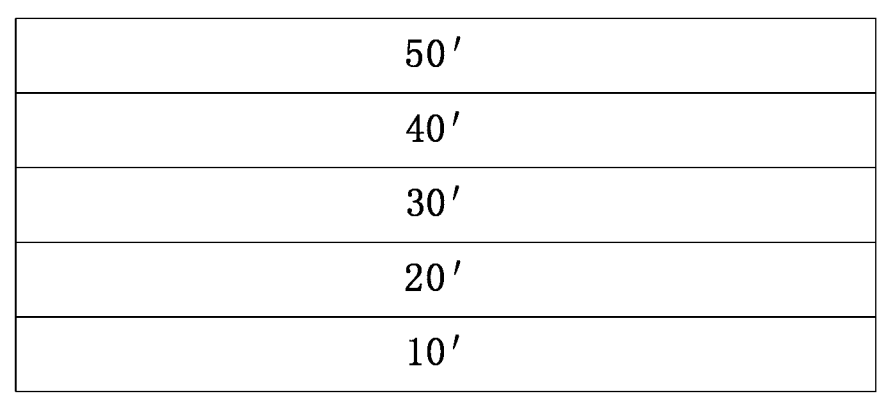

FIG. 1 is a schematic cross sectional view of a display panel in the prior art. As illustrated in FIG. 1, a display panel with touch function in the prior art includes a first substrate 10', a first electrode layer 20', a liquid crystal layer 30', a second substrate 40' and a second electrode layer 50' that are laminated from the bottom up.

FIG. 2 is a schematic diagram of each of the laminated layers of the display panel in the prior art. As illustrated in FIGS. 1 and 2, the first electrode layer 20' is disposed on the first substrate 10', and includes a plurality of first electrodes 21' extending in a first direction (i.e., the Y direction) and arranged in a second direction (i.e., the X direction). The first electrode 21' serves as a common electrode (i.e., a COM electrode) and receives a common voltage signal during a display period. The first electrode 21' also serves as a touch driving electrode (i.e., a Tx electrode) and receives a touch driving signal during a touch recognizing period. The second electrode layer 50' is disposed on the second substrate 40', and includes a plurality of second electrodes 51' extending in the second direction (i.e., the X direction) and arranged in the first direction (i.e., the Y direction) as shown. Intersection areas of the first electrode 21' and the second electrode 51' are formed in a projection plane of the array substrate 10'. During the touch recognizing period, the second electrode 51' and the first electrode 21' interact to perform a detection of a touched position.

FIG. 3 is an enlarged view of the area "U" of FIG. 2. As illustrated in FIG. 3, in the prior art, two adjacent first electrodes 21' have a first central distance $L_1$, and two adjacent second electrodes 51' have a second central distance $L_2$. The first electrode 21' has a first electrode width $W_1$ in the X direction, and two adjacent first electrodes 21' have a first gap width $D_1$ in the X direction. The second electrode 51' has a second electrode width $W_2$ in the Y direction, and two adjacent second electrodes 51' have a second gap width $D_2$ in the Y direction. The first central distance $L_1$ equals to a sum of the first electrode width $W_1$ and the first gap width $D_1$ (i.e., $L_1=W_1+D_1$). The second central distance $L_2$ equals to a sum of the second electrode width $W_2$ and the second gap width $D_2$ (i.e., $L_2=W_2+D_2$). Since the first electrode 21' serves both for display driving and touch sensing functions, the central distance $L_1$ of the two adjacent first electrodes in the display panel with a touch function in the prior art is generally far smaller than the central distance $L_2$ of the two adjacent second electrodes, so as to have a better display effect. Generally, in the prior art, a ratio "k" between the first central distance $L_1$ and the second central distance $L_2$ generally is: $0.1 \leq k < 0.5$.

Since the difference between the first and second central distances is large, a finger position corresponding to the minimal detectable level difference (i.e., the touch accuracy) in the prior art is low, thereby deteriorating the touch performance and user experience.

SUMMARY

According to one aspect of the present disclosure, there is provided a display panel including a first electrode layer, and a second electrode layer. The first electrode layer includes a plurality of first electrodes, each having a shape extending in a first direction, wherein the plurality of the first electrodes are arranged in a second direction The second electrode layer includes a plurality of second electrodes, each having a shape extending in the second direction, wherein the plurality of the second electrodes are arranged in the first direction, the second direction being perpendicular to the first direction. A ration between a first central distance between two adjacent first electrodes, and a second central distance between two adjacent second electrodes is in the range of 0.5 to 2.

According to another aspect of the present disclosure, there is further provided a display device including the above display panel.

BRIEF DESCRIPTION OF THE DRAWINGS

Other features, objectives and advantages of the present disclosure will become apparent from the detailed description of non-limiting embodiments with reference to the following accompanying drawings.

FIG. 1 is a schematic cross sectional view of a display panel in the prior art;

FIG. 4 is a schematic cross sectional view of a display panel according to the present disclosure;

DETAILED DESCRIPTION

Figure 2:
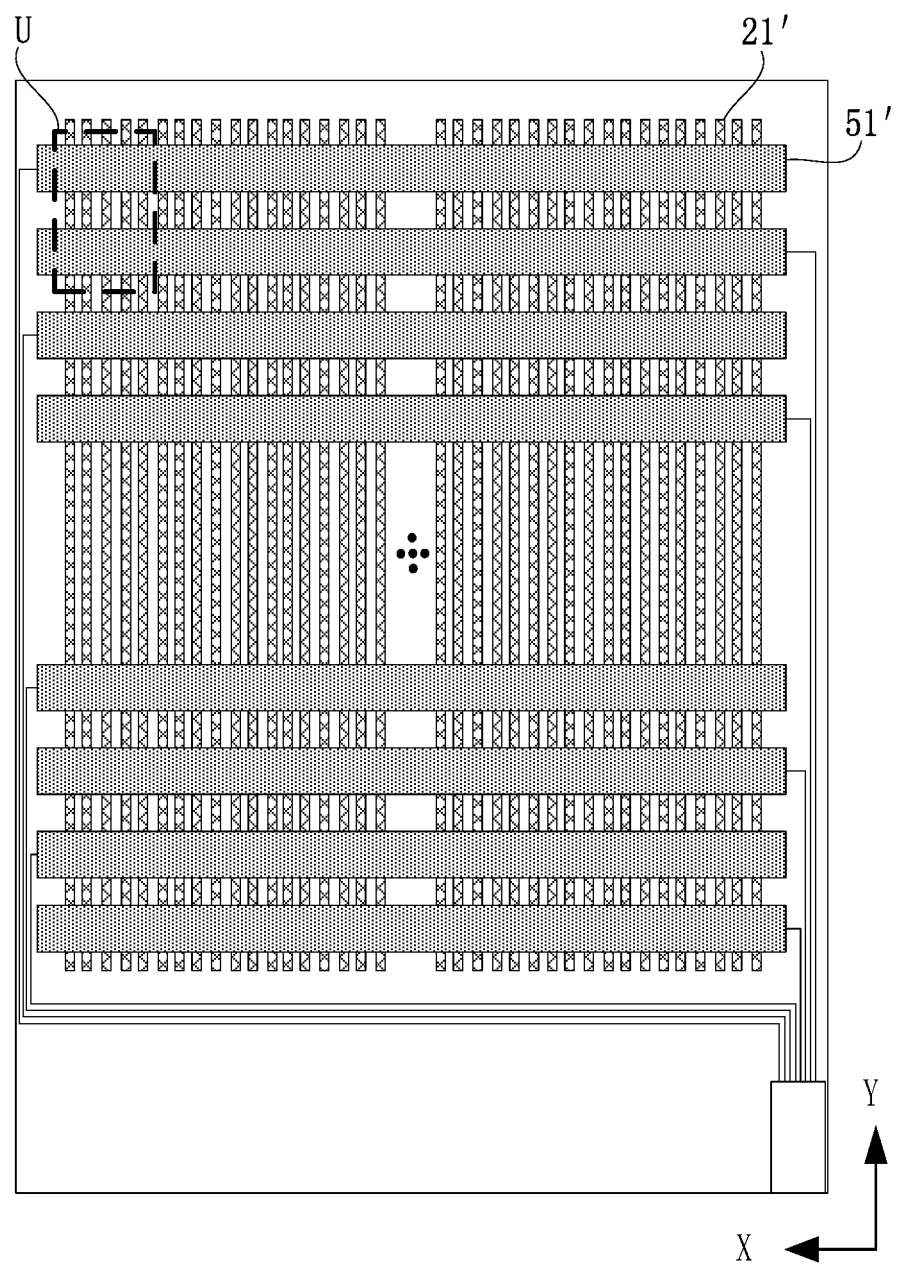
FIG. 2 is a schematic diagram of the lamination of each film/layer in the display panel according to the prior art.
Figure 3:
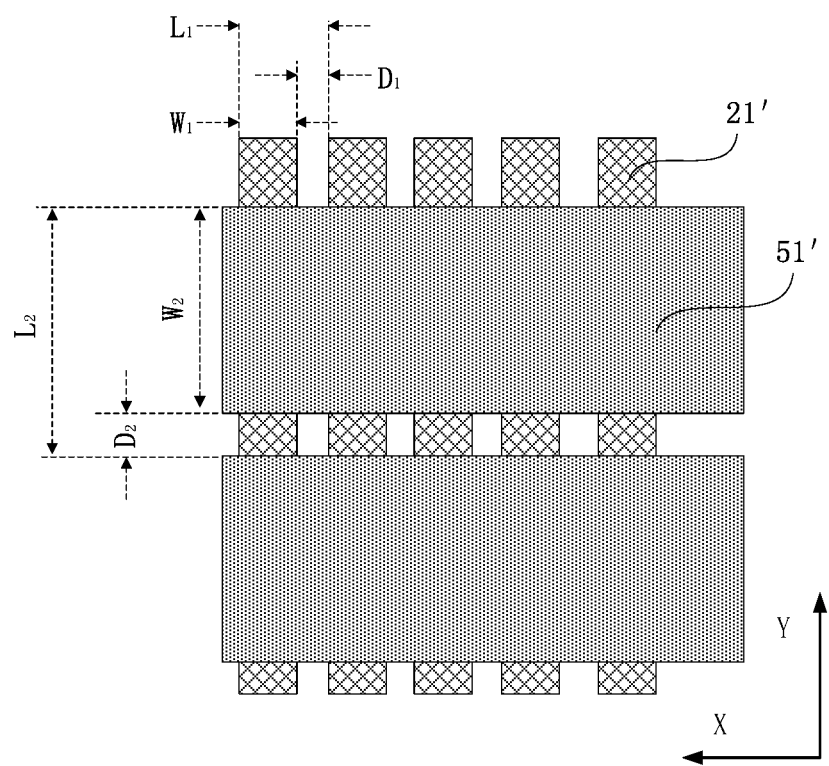
FIG. 3 is an enlarged view of the region U illustrated in FIG. 2.

Example implementations will now be described in further detail with reference to the accompanying drawings. The example implementation, however, may be embodied in various forms, and should not be construed as being limited to the implementations set forth herein. Rather, these implementations are provided so that the present invention will become thorough and complete, and will fully convey the concept of the inventive concept to those skilled in the art. Similar reference numerals denote the same or like structures throughout the accompanying drawings, and thus repeat description thereof will be omitted.

Figure 4:
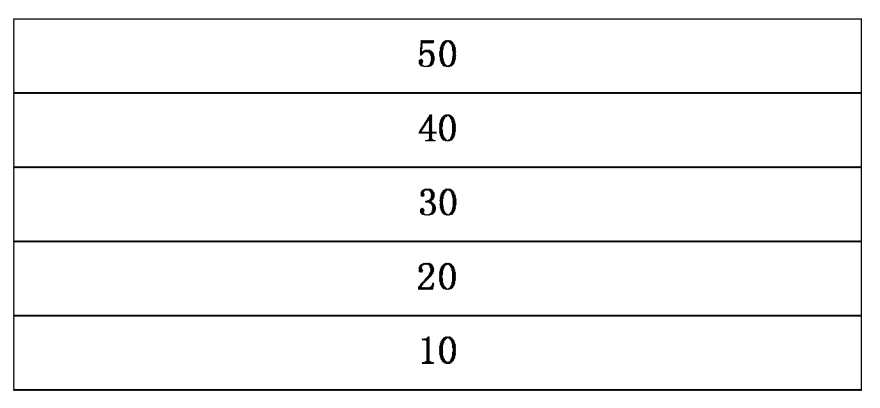

FIG. 4 is a schematic cross sectional view of a display panel according to the present disclosure. As illustrated in FIG. 4, the display panel 100 having a touch function according to the present disclosure includes a first substrate 10, a first electrode layer 20, a liquid crystal (LC) layer 30, a second substrate 40 and a second electrode layer 50. In the present embodiment, the first substrate 10, the first electrode layer 20, the LC layer 30, the second substrate 40 and the second electrode layer 50 are laminated from the bottom up for a better touch recognizing experience. However, this arrangement is not intended to be limiting. In an alternative example, the second electrode layer 50 may be interposed between the LC layer 30 and the second substrate 40, but is not limited thereto.

Figure 5:
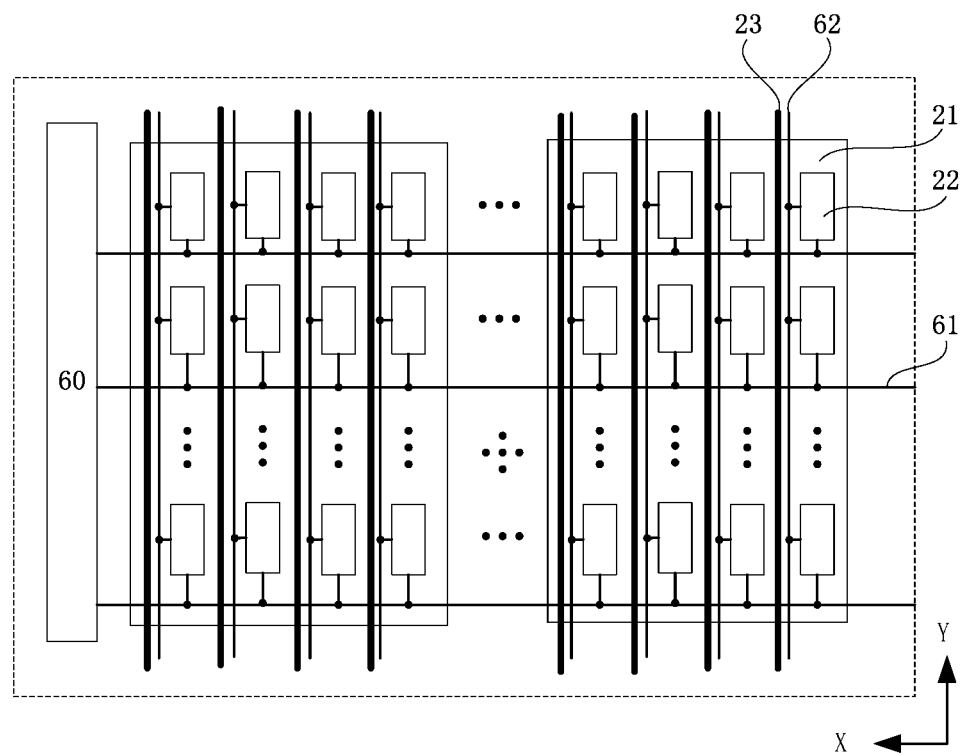
FIG. 5 is a structural diagram of a first substrate in the display panel according to the present disclosure.

FIG. 5 is a structural diagram of a first substrate in the display panel according to the present disclosure. Referring to FIGS. 4 and 5, the first electrode layer 20 is disposed on the first substrate 10. As shown, the first electrode layer 20 includes a plurality of first electrodes 21 extending in the Y direction and arranged in the X direction. In the embodiment, the Y direction is orthogonal to the X direction.

In the embodiment, the first electrode layer 20 is disposed on the first electrode 10 at a side facing the second substrate 40, and the second electrode 51 is disposed on the second substrate 40 at a side opposite to the first substrate 10. Accordingly, the second electrode 51 may be further close to a touch source, thereby improving touch performance of the panel.

As illustrated in FIG. 5, the first substrate 10 further includes touch lines 23 and data lines 62 extending in the Y direction and scan lines 61 extending in the X direction, and the data lines 62 and scan lines 61 are connected to each pixel electrode 22, respectively. Each of the scan lines 61 is connected to a gate driving unit 60.

The first electrode layer 20 of the present disclosure also serves as a common electrode layer.

The display panel of the present disclosure is driven in a time division manner. In particular, during the display period, the first electrode 21 serves as the common electrode and receives the common voltage signal, and during the touch period, the first electrode 21 serves as the touch driving electrode (i.e., the Tx electrode) and receives the touch driving signal transmitted from the touch lines 23.

In an embodiment of the present disclosure, the second electrode 51 serves as a touch sensing electrode (i.e., an Rx electrode). The first electrode 21 and the second electrode 51 are overlapped with each other in a projection plane of the array substrate 10. During the touch recognizing period, the second electrode 51 and the first electrode 21 interact to perform a touch detection, and obtain two dimensional position information of a touched position (e.g., of a finger) using an RC detecting circuit.

Figure 6:
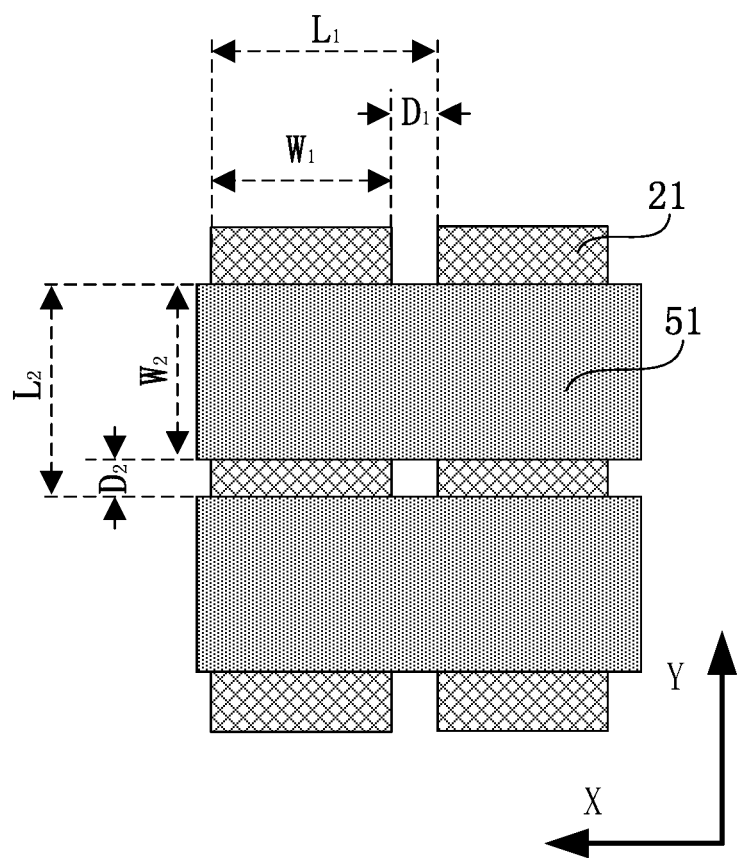
FIG. 6 is a detailed structural diagram of a first electrode and a second electrode according to the present disclosure.

In particular, FIG. 6 is a detailed structural diagram of a first electrode 21 and a second electrode 51 according to the present disclosure. As illustrated in FIG. 6, the second electrode 51 is extended in the X direction and arranged in the Y direction. Two adjacent first electrodes 21 have a first central distance $L_1$, and two adjacent second electrodes 51 have a second central distance $L_2$. The first electrode 21 has a first electrode width $W_1$ in the X direction, and two adjacent first electrodes 21 have a first gap width $D_1$ in the X direction. The second electrode 51 has a second electrode width $W_2$ in the Y direction, and two adjacent second electrodes 51 have a second gap width $D_2$ in the Y direction. The first central distance $L_1$ equals to a sum of the first electrode width $W_1$ and the first gap width $D_1$ (i.e., $L_1=W_1+D_1$). The second central distance $L_2$ equals to a sum of the second electrode width $W_2$ and the second gap width $D_2$ (i.e., $L_2=W_2+D_2$).

In the present disclosure, a ratio "k" between the first central distance $L_1$ and the second central distance $L_2$ is in a range of 0.5 to 2, i.e., $k=L_1/L_2=[0.5, 2]$. For example, in the present disclosure, the ratio "k" between the central distances may also equal to any one of 0.6, 0.7, 0.8, 0.9, 1.0, 1.1, 1.2, 1.3, 1.4, 1.5, 1.6, 1.7, 1.8 and 1.9. On the basis of the present disclosure, other technical solutions in which the ratio "k" between the central distances is within the range of 0.5 to 2 fall into the protection scope of the present disclosure.

Further, in a preferred embodiment, the ratio between the first central distance $L_1$ and the second central distance $L_2$ is 1, that is, the first central distance $L_1$ equals to the second central distance $L_2$. With the same touch sensing area, the first electrode 21 and the second electrode 51 are substantially the same in number, such that the total number of the first electrode 21 and the second electrode 51 is minimized, thereby improving the touch performance.

Figure 7:
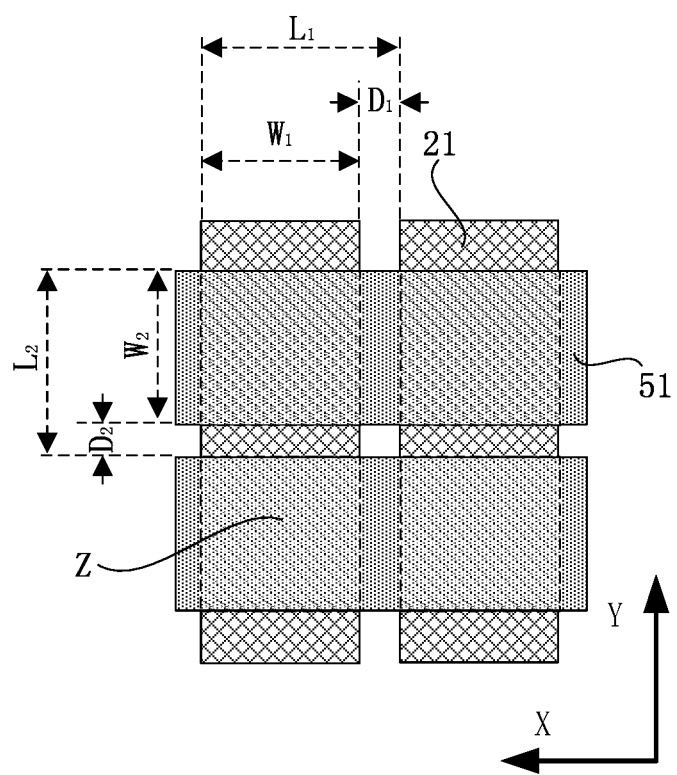
FIG. 7 is another detailed structural diagram of the first electrode and the second electrode according to the present disclosure.

Further, in the case where the ratio between the first central distance $L_1$ and the second central distance $L_2$ is 1, the first electrode width $W_1$ equals to the second electrode width $W_2$, and the first gap width $D_1$ equals to the second gap width $D_2$. Accordingly, the orthographic projections of the first electrode 21 and the second electrode 51 on the first substrate have an overlapped region, and the overlapped region is a square Z (as illustrated in FIG. 7). When the first electrode 21 and the second electrode 51 have the square overlapped region, the smallest touch sensing unit of the panel in the present disclosure has a square shape, which may further improve the touch performance.

Figure 8:
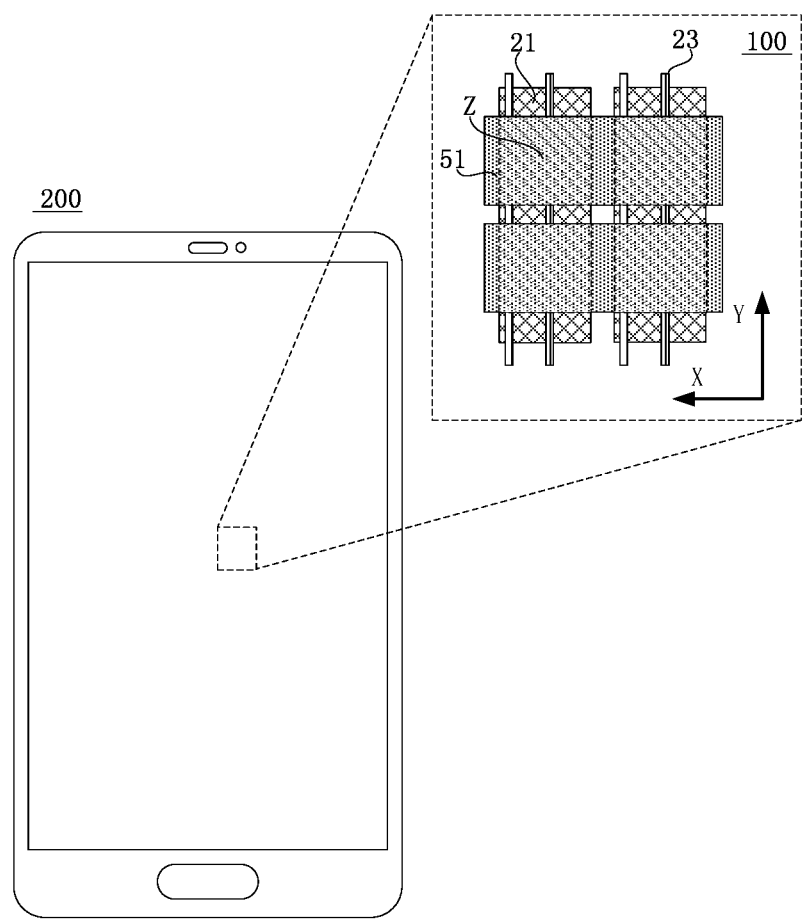
FIG. 8 is a schematic diagram of a display device according to the present disclosure.

FIG. 8 is a schematic diagram of a display device according to the present disclosure. As illustrated in FIG. 8, the display device according to the present disclosure is a mobile phone 200, but is not limited thereto. The mobile phone 200 includes the display panel 100 as described above, and corresponding technical features and effects will not be repeated herein.

Hereinafter, a 5.0 inch fifth generation FULL HD panel (full high definition panel having a resolution ratio of 1920×1080) is taken for an example, to compare an implementation effect of the present disclosure over the prior art. Assuming that each pixel has a size of 57.3 μm (e.g., a length of one side of the pixel is 57.3 μm), the first central distance $L_1$ of the first electrode 21 is 4.13 mm (about 72 pixels), and the second central distance $L_2$ of the second electrode 51 is 4.13 mm (about 72 pixels). A number of the first electrode 21 is 15, a number of the second electrode 51 is 27, and an area S of the touch unit is $L_1 \times L_2$.

Figure 9:
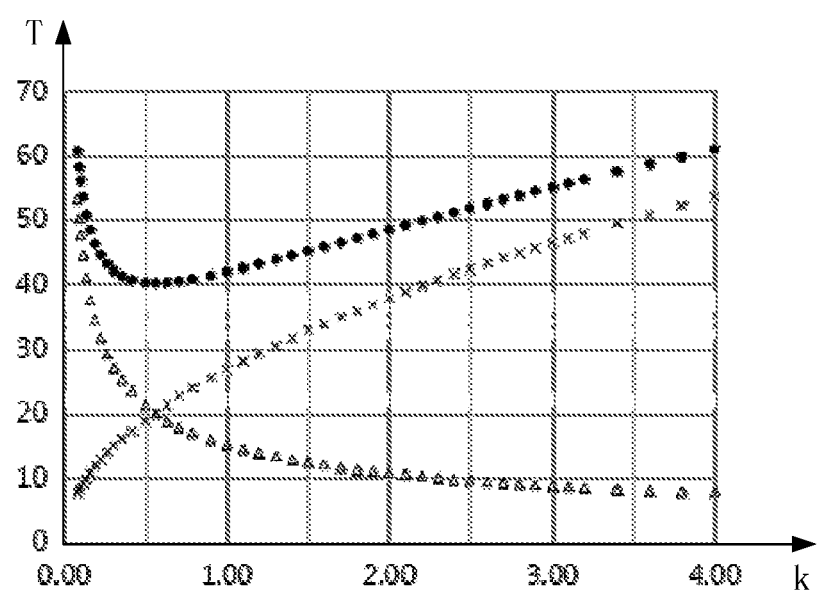
FIG. 9 is a relation graph between a central distance ratio and a number of the electrode.

FIG. 9 is a relation graph between a central distance ratio of the first electrode 21 and the second electrode 51 and a number of the electrodes. Assuming that the ratio between the first central distance L1 and the second central distance $L_2$ is "k", the number of the electrodes is T, as illustrated in FIG. 9, "Δ" represents a number of the first electrode 21, "×" represents a number of the second electrode 51, and "·" represents a total number of the first electrode 21 and the second electrode 51. As illustrated in FIG. 9, in the case where the capacitance value of the touch unit maintains unchanged, different "k" values correspond to different numbers of the first electrode 21 and the second electrode

51. If an area S of the touch unit is unchanged, the following equations may be derived: as $L_1/L_2=k$ varies, the number of the first electrode 21 will be:

$$n_{Tx}(k)=\sqrt{1/k} \times n_{Tx} \quad (1)$$

wherein, $n_{Tx}$ (1) represents a number of the first electrode 21 when $L_1/L_2=1$; and the number of the second electrode 51 will be:

$$n_{Rx}(k)=\sqrt{k} \times n_{RX} \quad (2)$$

wherein, $n_{Rx}(k)$ represents a number of the second electrode 51 when $L_1/L_2=1$. As can be seen from the above equations, in the case where the area S of the touch unit is unchanged, the total number of the first electrode 21 and the second electrode 51 is minimized as the central distant ratio "k" approaches 1.

Figure 10:
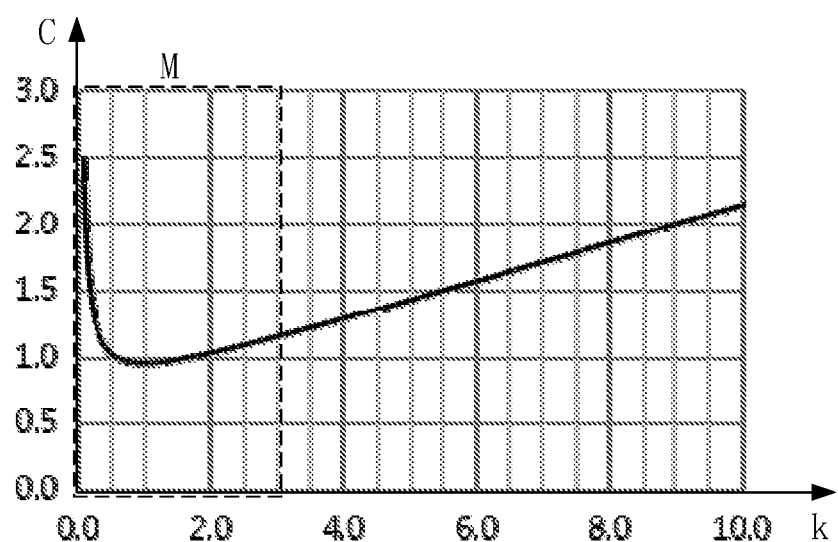
FIG. 10 is a relation graph between a central distance ratio and the touch accuracy.
Figure 11:
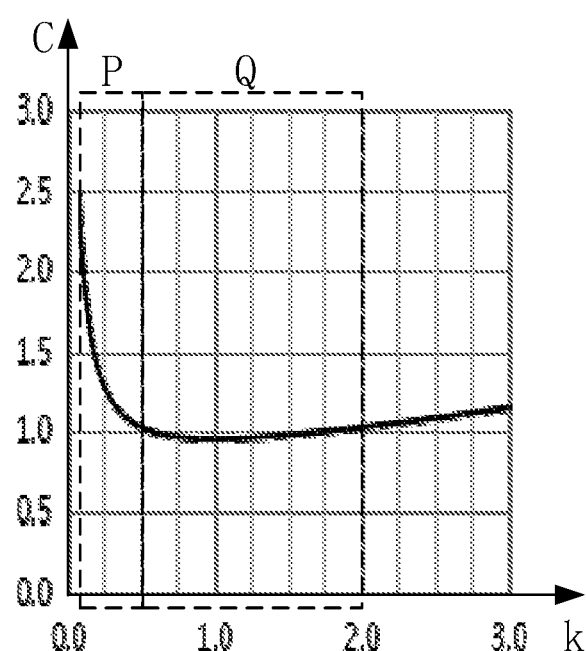
FIG. 11 is an enlarged view of the region M illustrated in FIG. 10.

FIG. 10 is a relation graph between a central distance ratio and the touch accuracy (i.e., the touch resolution). The touch resolution is represented by C as shown. FIG. 11 is an enlarged view of the region M illustrated in FIG. 10. With respect to a certain touch unit, different finger positions may generate different capacitances C1/C2, i.e., different total capacitance $C_{Rx}$. Therefore, corresponding coupling levels are different. Accordingly, the touch resolution is a finger position corresponding to the minimal detectable level difference (i.e., the minimal detectable finger displacement measured in mm) under a certain signal-noise ratio. According to the equation of plate capacitors:

$$C=(\varepsilon_0 \varepsilon_r S/4\pi k d) \quad$$

wherein the capacitance C is measured in F (Farad), $\varepsilon_0$ represents the vacuum permittivity of $8.86 \times 10^{-12}$ F/m, $\varepsilon_r$ represents the relative dielectric permittivity, the area S is measured in $m^2$, $\pi$ represents the Pi, k represents the electrostatic constant, and the electrode plate distance d is measured in meters. Assuming that the capacitances between the first and second electrodes 21 and 51 and a touch source (e.g., a finger) are C1 and C2, respectively, and the capacitance between the first electrode 21 and the second electrode 51 is C0, the total capacitance on the second electrode 51 is $C_{Rx}$, the capacitance on the first electrode 21 is $C_{Tx}$, and an intensity of the coupled signal on the second electrode 51 is proportional to $(C_0/C_{Tx})$.

As illustrated in FIGS. 10 and 11, under the same signal-noise ratio, the central distance ratio "k" between the first central distance $L_1$ and the second central distance $L_2$ in the prior art (the region P) is generally in the range of $0.1 \leq L < 0.5$, which corresponds to a touch resolution C of 1 mm to 2 mm. Currently, a standard touch resolution is about 1.2 mm. According to the present disclosure (the region Q), the central distance ratio "k" is in the range of 0.5 to 2, which corresponds to a touch resolution C smaller than 1 mm. The smaller the touch resolution of the display panel, the better the touch performance of the display panel is. Accordingly, the touch resolution of the present disclosure is increased by 20% over the touch resolution in the prior art.

Figure 12:
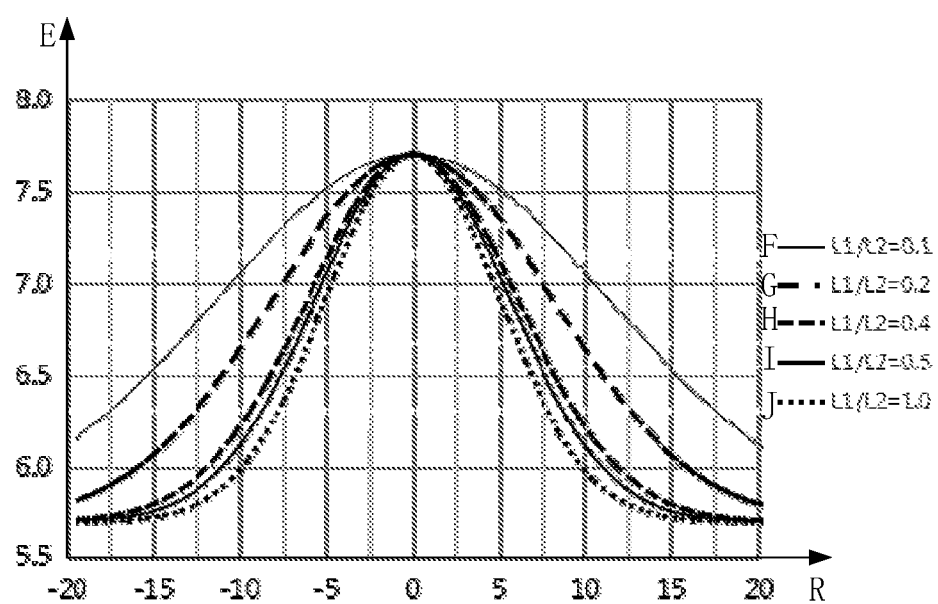
FIG. 12 is a relation graph between a total capacitance of touch sensing electrodes and a finger position.

FIG. 12 is a relation graph between a total capacitance of the second electrode and a finger touching region. In FIG. 12, a horizontal axis R represents the finger touching region measured in mm, and the longitudinal axis E represents the capacitance value measured in pF. As illustrated in FIG. 12, the graph F represents a graph of a total capacitance of the second electrode corresponding to the electrode arrangement when k=0.1. The graph G represents a graph of a total capacitance of the second electrode corresponding to the electrode arrangement when k=0.2. The graph H represents a graph of a total capacitance of the second electrode corresponding to the electrode arrangement when k=0.4. The graph I represents a graph of a total capacitance of the second electrode corresponding to the electrode arrangement when k=0.5. The graph J represents a graph of a total capacitance of the second electrode corresponding to the electrode arrangement when k=1.0. Comparing graphs F, G, H, I and J, it can be seen that among the data corresponding to the five graphs, under the same total capacitance, finger positions corresponding to graphs I and J are significantly smaller than those corresponding to graphs F, G and H. Accordingly, in the present embodiments, the electrode arrangements represented by graphs I and J are significantly better than the prior art.

To sum up, in the display panel and the display device according to the present disclosure, by changing the ratio between the central distance of the touch driving electrode and the central distance of the touch sensing electrode, the display effect is reconciled with the touch recognizing performance, thereby improving the touch performance of the panel and user experience.

Detailed embodiments of the present disclosure have been described above. It should be appreciated that, the present disclosure is not limited to the above particular implementations. Various changes or modifications, which do not affect the substantial content of the present disclosure, are available to those skilled in the art within the scope of the claims.

What is claimed is:

1. A display panel, comprising:
   a first electrode layer comprising a plurality of first electrodes, each having a first edge and a second edge extending in a first direction, wherein:
   the first direction is vertical on the display panel;
   the plurality of the first electrodes are arranged in a second direction; and
   the second direction is horizontal on the display panel;
   a second electrode layer comprising a plurality of second electrodes, each having a third edge and a fourth edge extending in the second direction, wherein:
   the plurality of the second electrodes are arranged in the first direction;
   a ratio between a first distance between the first edges of two adjacent first electrodes, and a second distance between the third edges of two adjacent second electrodes is greater than 0.5 and smaller than 1.0;
   a width of the first electrode equals to a width of the second electrode; and
   an orthographic projection of the first electrode on the second electrode has an overlapped region with the second electrode, and the overlapped region is a square.

2. The display panel according to claim 1, wherein the first electrode has a first electrode width in the second direction, and the two adjacent first electrode have a first gap width in the second direction; and
   the second electrode has a second electrode width in the first direction, and the two adjacent second electrodes have a second gap width in the first direction,
   wherein the first distance equals to a sum of the first electrode width and the first gap width, and the second distance equals to a sum of the second electrode width and the second gap width.

3. The display panel according to claim 1, further comprising:
   a first substrate and a second substrate arranged opposite to each other, and a liquid crystal layer interposed between the first substrate and the second substrate.

4. The display panel according to claim 3, wherein the first electrode layer is disposed on the first substrate at a side facing the second substrate, and the second electrode layer is disposed on the second substrate at a side opposite to the first substrate.

5. The display panel according to claim 3, further comprising a data line and a scan line disposed on the first substrate, the data line extending in the first direction, and the scan line extending in the second direction.

6. The display panel according to claim 3, wherein the first electrode layer also serves as a common electrode layer.

7. The display panel according to claim 6, wherein the display panel is driven in a time division manner, and wherein:
during a display period, the first electrode receives a common voltage signal, and
during a touch period, the first electrode receives a touch driving signal.

8. A display device, comprising:
a display panel, comprising:
a first electrode layer comprising a plurality of first electrodes, each having a first edge and a second edge extending in a first direction, wherein:
the first direction is vertical on the display panel;
the plurality of the first electrodes are arranged in a second direction; and
the second direction is horizontal on the display panel;
a second electrode layer comprising a plurality of second electrodes, each having a third edge and a fourth edge extending in the second direction, wherein:
the plurality of the second electrodes are arranged in the first direction;
a ratio between a first distance between the first edges of two adjacent first electrodes, and a second distance between the third edges of two adjacent second electrodes is greater than 0.5 and smaller than 1.0;
a width of the first electrode equals to a width of the second electrode; and
an orthographic projection of the first electrode on the second electrode has an overlapped region with the second electrode, and the overlapped region is a square.

9. The display device according to claim 8, wherein the first electrode has a first electrode width in the second direction, and the two adjacent first electrode have a first gap width in the second direction; and
the second electrode has a second electrode width in the first direction, and the two adjacent second electrodes have a second gap width in the first direction,
wherein the first distance equals to a sum of the first electrode width and the first gap width, and the second distance equals to a sum of the second electrode width and the second gap width.

10. The display device according to claim 8, further comprising a first substrate and a second substrate arranged opposite to each other, and a liquid crystal layer interposed between the first substrate and the second substrate.

11. The display device according to claim 10, wherein the first electrode layer is disposed on the first substrate at a side facing the second substrate, and the second electrode layer is disposed on the second substrate at a side opposite to the first substrate.

12. The display device according to claim 10, further comprising a data line and a scan line disposed on the first substrate, the data line extending in the first direction, and the scan line extending in the second direction.

13. The display device according to claim 10, wherein the first electrode layer also serves as a common electrode layer.

14. The display device according to claim 13, wherein the display panel is driven in a time division manner, and wherein:
during a display period, the first electrode receives a common voltage signal, and
during a touch period, the first electrode receives a touch driving signal.

15. The display panel according to claim 1, wherein the ratio between the first distance between the first edges of two adjacent first electrodes, and the second distance between the third edges of two adjacent second electrodes is in the range of 0.6 to 0.9.

16. The display device according to claim 8, wherein the ratio between the first distance between the first edges of two adjacent first electrodes, and the second distance between the third edges of two adjacent second electrodes is in the range of 0.6 to 0.9.

17. The display panel according to claim 3, wherein the first electrode layer is disposed on the first substrate at a side facing the second substrate, and the second electrode layer is disposed on the second substrate at a side facing the first substrate.

18. The display device according to claim 10, wherein the first electrode layer is disposed on the first substrate at a side facing the second substrate, and the second electrode layer is disposed on the second substrate at a side facing the first substrate.

* * * * *